United States Patent
Xue et al.

(10) Patent No.: US 7,746,822 B2
(45) Date of Patent: Jun. 29, 2010

(54) DYNAMIC MULTI-ACCESS RELAYING FOR WIRELESS NETWORKS

(75) Inventors: Feng Xue, Santa Clara, CA (US); Sumeet Sandhu, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 622 days.

(21) Appl. No.: 11/729,451

(22) Filed: Mar. 29, 2007

(65) Prior Publication Data

US 2008/0240018 A1    Oct. 2, 2008

(51) Int. Cl.
*H04B 7/14*    (2006.01)
(52) U.S. Cl. .................. 370/328; 455/422.1
(58) Field of Classification Search ........... 455/445, 455/11.1, 7, 522, 24; 370/338, 400, 328, 370/340, 535, 315
See application file for complete search history.

(56) References Cited

U.S. PATENT DOCUMENTS

| 5,241,686 A * | 8/1993 | Charbonnier ............... 455/453 |
| 2004/0266339 A1* | 12/2004 | Larsson ........................ 455/7 |
| 2005/0014464 A1* | 1/2005 | Larsson ..................... 455/11.1 |
| 2007/0002766 A1* | 1/2007 | Park et al. ................... 370/254 |
| 2007/0160014 A1* | 7/2007 | Larsson ...................... 370/338 |

OTHER PUBLICATIONS

"Throughput Optimal Control of Cooperative Relay Networks," by Yeh et al. Proceedings of the International Symposium on Information Theory, Adelaide, Australia, pp. 1206-1210, Sep. 2005.*
"Throughpt Optimal Control of Cooperative Relay Networks," by Yeh et al., MSRI Workshop, Viewgraph presentation dated Apr. 10, 2006.*
Laneman, J. N., et al., "Cooperative Diversity in Wireless Networks: Efficient Protocols and Outage Behavior", IEEE Transactions on Information Theory, vol. 50, No. 12, Dec. 2004, 19.
Sanderovich, Amichai, et al., "LDPC Coded MIMO Multiple Access With Iterative Joint Decoding", IEEE Transactions on Information Theory, vol. 51, No. 4, Apr. 2005, 14.

* cited by examiner

*Primary Examiner*—Dwayne Bost
*Assistant Examiner*—Myron Wyche
(74) *Attorney, Agent, or Firm*—Schubert Osterrieder & Nickelson PLLC; James L. Nickelson

(57) ABSTRACT

Methods, apparatuses and systems for communicating in a wireless network are disclosed. One embodiment includes a method for communication in a wireless network that comprises determining a signal-to-noise ratio (SNR) for channels between a base station, one or more relay stations, and a user and selecting a relay station based on the determined SNRs. Embodiments may also include determining a time sharing parameter and a total transmitting time, transmitting by the base station to the selected relay station for a first duration, and transmitting simultaneously by the base station and relay station using multi-access code for a second duration. The simultaneous transmission may be adapted to be decoded utilizing joint decoding with interference cancellation. Other embodiments are disclosed and claimed.

14 Claims, 4 Drawing Sheets

DYNAMIC MULTI-ACCESS RELAYING FOR WIRELESS NETWORKS

FIELD

Embodiments are in the field of wireless communications. More particularly, embodiments are in the field of wireless relay networks.

BRIEF DESCRIPTION OF THE DRAWINGS

Aspects of embodiments of the invention will become apparent upon reading the following detailed description and upon reference to the accompanying drawings in which like references may indicate similar elements.

DETAILED DESCRIPTION OF EMBODIMENTS

Figure 1:
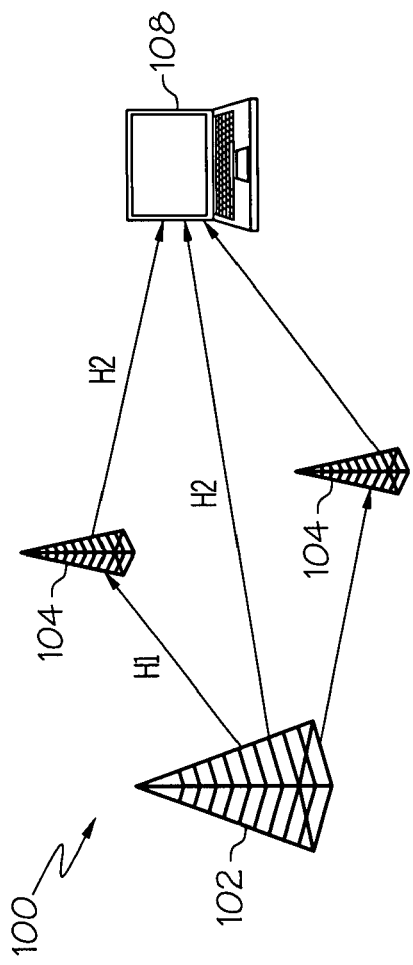
FIG. 1 depicts a block diagram illustrating an arrangement of a wireless network including a base station, multiple relay stations, and a user according to various embodiments.

The following is a detailed description of embodiments of the invention depicted in the accompanying drawings. The embodiments are introduced in such detail as to clearly communicate the invention. However, the embodiment(s) presented herein are merely illustrative, and are not intended to limit the anticipated variations of such embodiments; on the contrary, the intention is to cover all modifications, equivalents, and alternatives falling within the spirit and scope of the appended claims.

It is becoming increasingly attractive to use nodes in a wireless network as relaying points to extend range, improve reliability, and/or reduce costs of the wireless network. For example, in a wireless wide area network (WWAN) or wireless metropolitan area network (WMAN) that requires deployment of distributed base stations across large areas, the base stations need to be connected to a core network and/or each other via some type of backhaul. In conventional networks, the backhaul has typically consisted of wired connections. However, a wireless backhaul, rather than, or in some combination with, a wired backhaul is being increasingly considered to ease deployment and reduce costs associated with these networks. Relay nodes may also be used in extending coverage and increasing capacity as shown in the Institute of Electrical and Electronics Engineers (IEEE) 802.16j (Mobile Multihop Relay) standard.

A type of network which uses wireless stations to relay signals between a source and destination are colloquially referred to as mesh networks. In mesh networks, wireless network nodes may form a "mesh" of paths for which a communication may travel to reach its destination. Cooperative techniques using relay stations can be applied to improve network capacity and reliability by utilizing cooperation among nodes of the network. The use of a wireless mesh network as a wireless backhaul has become the subject of much focus and there are ongoing efforts to increase the efficiency of transmissions through wireless mesh networks. Moreover, as wireless networks become denser and denser, the problems caused by interference continue to increase using current techniques.

While the following detailed description may describe example embodiments of the present invention in relation to wireless wide area networks (WWANs) such as the WiMAX system for wireless metropolitan area networks promulgated as part of IEEE 802.16 standard (also known as wireless metropolitan area networks (WMANs)), the inventive embodiments are not limited thereto and can be applied to other types of wireless networks where similar advantages may be obtained. Such networks for which inventive embodiments may be applicable specifically include, wireless personal area networks (WPANs), wireless local area networks (WLANs), WWANs such as cellular networks, and/or combinations of any of these networks.

The following inventive embodiments may be used in a variety of applications including transmitters and receivers of a radio system. Radio systems specifically included within the scope of the present invention include, but are not limited to, network interface cards (NICs), network adaptors, mobile stations, base stations, access points (APs), hybrid coordinators (HCs), gateways, bridges, hubs and routers. Further, the radio systems within the scope of the invention may include cellular radiotelephone systems, satellite systems, personal communication systems (PCS), two-way radio systems and two-way pagers as well as computing devices including radio systems such as personal computers (PCs) and related peripherals, personal digital assistants (PDAs), personal computing accessories and all existing and future arising systems which may be related in nature and to which the principles of the inventive embodiments could be suitably applied.

FIG. 1 depicts a block diagram illustrating an arrangement of a wireless network including a base station, multiple relay stations, and a user according to various embodiments. A wireless network 100 (which may also be known as a mesh network 100) according to various inventive embodiments may be any system having devices (also known as 'nodes') capable of transmitting and/or receiving information via over-the-air (OTA) radio frequency (RF) links to and from a user 108. As will be described in more detail subsequently, the disclosed system may utilize selective decoding and then multi-access with rate adaptation to provide communication between devices in the wireless network 100. This allows for a higher transmission rate than direct transmission or non-adaptive multi-hop relaying.

In the disclosed system, a base station 102 may select a cooperative relay station 104 from a plurality of relay stations 104 to facilitate communication according to embodiments of the present invention. The base station 102 may select the cooperative relay station 104 based on measured signal-to-noise ratios (SNRs), as will be described in more detail subsequently. The total transmission time to send data packets to a user 108 may then be divided into two stages with optimal time-sharing. In the first stage (represented by 'H1' in FIG. 1 if the upper relay station 104 is selected) the base station 102 may send data packets to the selected relay station 104. In the second stage (represented by 'H2' in FIG. 1), the relay station 104 sends the original data packets to the user 108 and the base station 102 sends new data packets to the user 108 simultaneously using joint multi-access coding and decoding architecture. In addition, quadrature amplitude modulation (QAM) points may be multiplied by a sequence of random phases to mitigate the possible correlation between fading channels. The disclosed system has been shown to achieve better performance than time division multiple access (TDMA) or other wireless technologies.

An example will illustrate potential performance benefits of the disclosed system. Consider a WiMAX relay network where there are two relay stations 104 between the base station 102 and the user 108. A simulation may be conducted based on the IEEE 802.16 channel model utilizing heights of the base station 102, relay stations 104, and user 108 as 30 meters, 12 meters, and 2 meters, respectively. Other assumptions of the simulation include the power of the base station 102 is 42 dBm, the powers of the relay stations 104 are 35 dBm, the carrier frequency is 3.5 GHz, the path loss exponent is 2, the receive sensitivity is −94 dBm, and the outage probability is one percent (1%). A simulation performed with these options indicates that the disclosed system provides a 3 dB gain to simple relaying, an 8 dB gain to direct transmission with twice the power, and a 10 dB gain to direct transmission with the same power.

In certain embodiments, the components of wireless network 100 may be devices which communicate using wireless protocols and/or techniques compatible with one or more of the Institute of Electrical and Electronics Engineers (IEEE) various 802 wireless standards including for example, 802.11 (a), (b), (g), (n) and/or (s) standards for WLANs, 802.15 standards for WPANs, and/or 802.16 standards for WMANs, as well as other technologies such as cellular networks, the 3G standard, or the 4G standard, although the inventive embodiments are not limited in this respect. In an exemplary embodiment, the components communicate using wireless protocols and/or techniques compatible with the IEEE 802.16j Mobile Multi-hop Relay Task Group for communication in WMANs. Base stations 102 and relay stations 104 may typically have such capabilities as performing association, authentication, time/frequency resource allocation, or other tasks.

In certain non-limiting example implementations of the inventive embodiments, the base station 102 in wireless network 100 may be a wireless transceiver that is connected to a core network, such as an Internet protocol (IP) network, via a physical wired connection (e.g., electrical or fiber optic connection). Additionally, in certain embodiments, the relay stations 104 in network 100 may be wireless transceivers that are not connected to a core network by electrical or wires or optical cables but rather provide a wireless backhaul as mentioned previously. These types of stations may be fixed radio relay nodes which are sometimes also referred to as "micro" or "pico" base stations (depending on the size of their coverage area). In a typical arrangement, relay stations 104 are not directly connected to a wire infrastructure and have the minimum functionality to support multi-hop communication. The users 108 may be a device having a wireless transceiver for communication to and from base stations 102 and relay stations 104.

Figure 2:
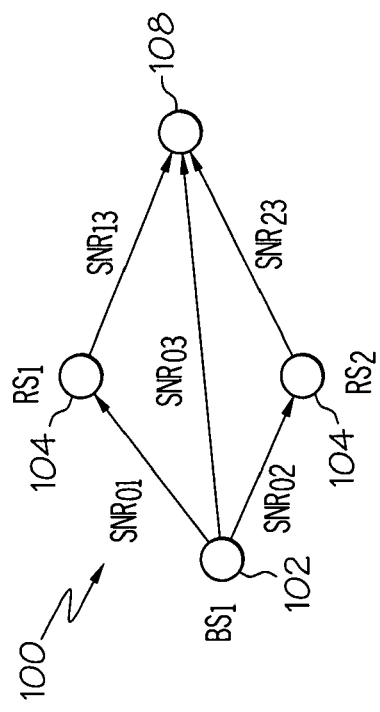
FIG. 2 depicts a block diagram illustrating the wireless network of FIG. 1 during a first stage of operation according to various embodiments.

FIG. 2 depicts a block diagram illustrating the wireless network 100 of FIG. 1 during a first stage of operation according to various embodiments. In the embodiment of FIG. 2, the base station 102 (labeled BS1) may send out a pilot so that the relay stations 104 and the user 108 can measure their SNR from the base station 102. In the depicted embodiment, SNR01 represents the path and SNR from the base station 102 (BS1) and a first relay station 104 (RS1). Similarly, SNR02 represents the path and SNR from the base station 102 (BS1) and a second relay station 104 (RS2). The path and SNR from the base station 102 and the user 108 is depicted as SNR03 in FIG. 2.

The relay stations 104 may also send out pilots so that the user 108 can measure the SNRs for the channel between the user 108 and each individual relay station 104. In the depicted embodiment, SNR13 represents the path and SNR from RS1 and the user 108 while SNR23 represents the path and SNR from RS2 and the user 108. The base station 102 and relay stations 104 may send out their pilots simultaneously, partially overlapping in time, or at different times. While the embodiment of FIG. 2 is depicted with two relay stations 104, one of ordinary skill in the art will recognize that any number of relay stations 104 may be utilized with the disclosed system.

After SNRs for each channel have been determined, the base station 102 may choose the relay station 104 which gives the largest rate for the cooperative relay (i.e., the relay station 104 that will cooperate with the base station 102 in accordance with the disclosed embodiments). The base station 102 may calculate the rate using the equation:

$$C\_sd\_mac := \log2(1+SNR0i)*\log2(1+SNR03+SNRi3)/(\log2(1+SNR03+SNRi3)+\log2(1+SNR0i)-\log2(1+SNR03)), i=1,2$$

according to some embodiments. In the above equation, C_sd_mac represents the rate and 'i' represents the relay stations 104 in the wireless network 102. In an embodiment with more than two relay stations 104, 'i' would be equal to the number of relay stations 104 and the rate would be calculated for each relay station 104. The base station 104 may typically choose the relay station 104 with the highest rate as its cooperative relay, but in alternative embodiments may also consider other factors such as availability of relay stations 104, current or anticipated network traffic, etc.

Once the base station 102 has selected a relay station 104, the base station 102 may determine the time-sharing parameter (λ) for the next two stages as:

$$\lambda = \log2(1+SNR01)/(\log2(1+SNR03+SNR13)+\log2(1+SNR01)-\log2(1+SNR03))$$

according to some embodiments, assuming that relay station one is chosen. If another relay station 104 is chosen, the appropriate SNRs may be substituted in the above equation. As will be described in more detail subsequently, the time-sharing parameter (λ) may be used to determine the transmission time for each stage of the disclosed methodology.

Figure 3:
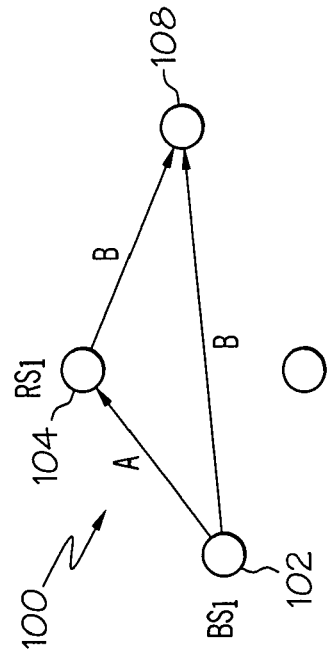
FIG. 3 depicts a block diagram illustrating the wireless network of FIG. 1 during a second and third stage of operation according to various embodiments.

FIG. 3 depicts a block diagram illustrating the wireless network 100 of FIG. 1 during a second and third stage of operation according to various embodiments. In the embodiment of FIG. 3, the base station 102 (labeled BS1) is in cooperation with relay station one (RS1) to communicate with user 108. In the second stage of operation, the base station 102 may transmit to the selected relay station 104 with rate log2(1+SNR01). This transmission is represented in FIG. 3 by the arrow labeled 'A'. The base station 102 may utilize any type of coding-decoding strategy, such as turbo code, convolution code, or low-density parity-check (LDPC) code. The base station 102 may transmit to the selected relay station 104 for a duration (1−λ)T where T is the total transmitting time.

In the third stage (represented by arrows labeled 'B'), the base station 102 and selected relay station 104 transmit simultaneously to the user 108 utilizing jointly-designed multi-access code that is suitable for joint decoding with interference cancellation by the user 108. Both the base station 102 and the selected relay station 104 transmit for a duration $\lambda T$ (i.e., the remainder of the total transmission time after the second stage). The coding rate for the base station 102 is equal to $\log 2(1+\text{SNR}03)$ according to some embodiments while the coding rate for the relay station 104 is equal to $\log 2(1+\text{SNR}03+\text{SNR}13)-\log 2(1+\text{SNR}03)$. Random phases may also be introduced to make the channels to the user 108 independent. Decoding of the simultaneous signals by the user 108 will be described subsequently.

Figure 4:
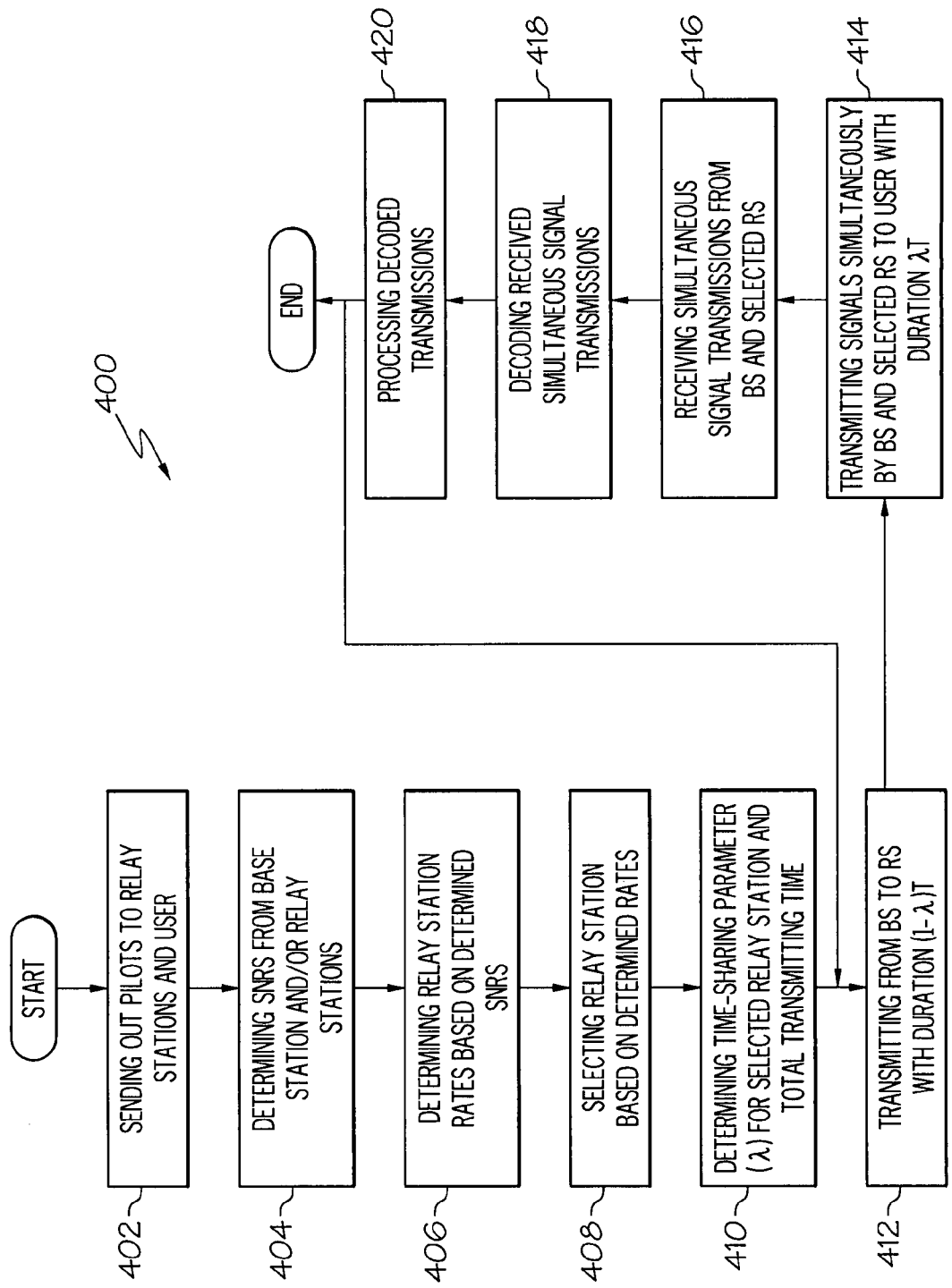
FIG. 4 depicts a flow diagram illustrating a method for dynamically adjusting a time-sharing parameter and transmitting using multi-access coding-decoding according to various embodiments.

FIG. 4 depicts a flow diagram illustrating a method for dynamically adjusting a time-sharing parameter and transmitting using multi-access coding-decoding according to various embodiments. Some or all of the elements of method 400 may be performed by components of the wireless network 100, such as a base station 102 or relay station 104. Method 400 begins with element 402, sending out pilots to relay stations 104 and the user 108 to which a transmission will be made. At element 402, the base station 102 may send out its pilot to both the relay stations 104 and the user 108 so that each may determine their SNR for their channel with the base station 102. Similarly, each relay station 104 may send out its pilot to the user 108 so that the user 108 may determine the SNR for each relay station/user channel. At element 404, each relay station 104 and the user 108 may determine these SNRs based on the received pilots from the base station 102 and/or relay stations 104.

After the SNRs for each channel have been determined, the base station 102 may at element 406 determine the relay station rates based on the determined SNRs and, at element 408, may select a cooperative relay station 104 based on the determined rates. Once a relay station 104 has been selected to be a cooperative relay, the base station 102 may determine the time-sharing parameter ($\lambda$) for the selected relay station 104 as well as a total transmitting time (T) for the broadcast to the user 108. The methodology for determining relay station rates, selecting a cooperative relay station 104, and determining the time-sharing parameter ($\lambda$) and total transmitting time (T) are described in relation to FIG. 2 and the discussion will not be repeated here in the interest of brevity. Elements 402, 404, 406, 408, and 410 may be considered a first stage of the disclosed system and methodology (as discussed in relation to FIG. 2) to determine an appropriate configuration for the later stages where data packets are transmitted to a user 108.

At element 412, the base station 102 performs the second stage by transmitting data packets in a signal from the base station 102 to the selected relay station 104 with a duration of $(1-\lambda)T$. As described previously in relation to FIG. 3, the base station 102 may utilize any type of coding-decoding strategy, such as LDPC, turbo code, or convolution code.

At element 414, the base station 102 and the selected relay station 104 may begin performance of the third stage by simultaneously transmitting to the user 108 signals utilizing jointly-designed multi-access code that is suitable for joint decoding with interference cancellation by the user 108. As described previously in relation to FIG. 3, both the base station 102 and the selected relay station 104 may transmit for a duration $\lambda T$. The coding rate for the base station 102 is equal to $\log 2(1+\text{SNR}03)$ according to some embodiments while the coding rate for the relay station 104 is equal to $\log 2(1+\text{SNR}03+\text{SNR}13)-\log 2(1+\text{SNR}03)$. Random phases may also be introduced at element 414 to make the channels to the user 108 independent.

The user 108 may receive the simultaneous transmissions of data packets from the base station 102 and selected relay station 104 at element 416. The user 108 may then decode the received simultaneous transmissions at element 418 in order to extract information from the data packets, as will be described in more detail in relation to FIG. 8. In some embodiments, the decoding performed by the user 108 is joint interference cancellation with assistance from the second stage signal. After decoding the signal, the user 108 may process the decoded transmissions at element 420, after which the process may terminate or return to element 412 for additional transmissions.

Figure 5:
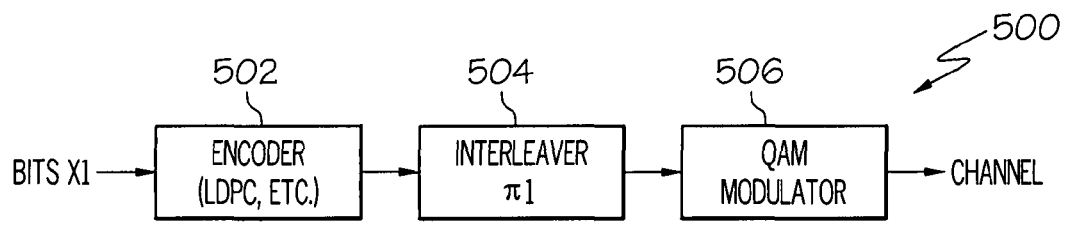
FIG. 5 depicts a block diagram showing an example encoding block for a base station during the second stage according to various embodiments.
Figure 6:
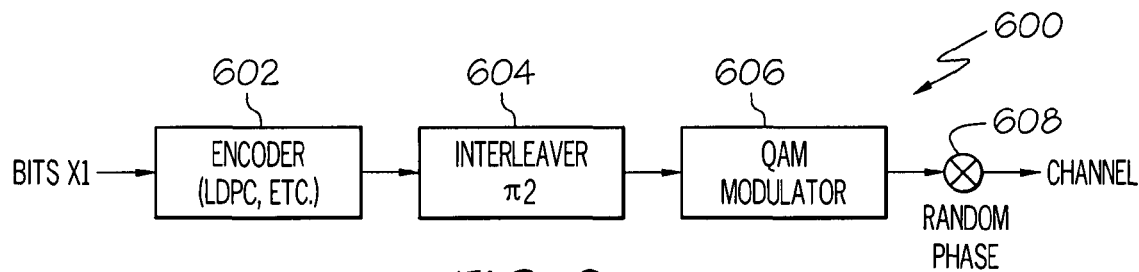
FIG. 6 depicts a block diagram showing an example encoding block for a relay station during the third stage according to various embodiments.
Figure 7:
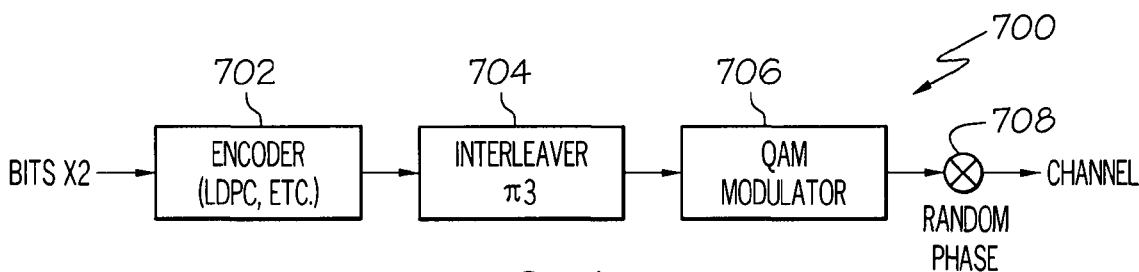
FIG. 7 depicts a block diagram showing an example encoding block for a base station during the third stage according to various embodiments.

FIGS. 5-7 depict exemplary encoding blocks suitable for use by base stations 102 and/or relay stations 104 in accordance with the present embodiments. FIG. 5 depicts a block diagram showing an example encoding block for a base station 102 during the second stage according to various embodiments. Encoding block 500 includes an encoder 502, an interleaver 504, and a QAM modulator 506. Data enters the encoder 502 for encoding, and encoder 502 may utilize any type of encoding scheme, such as LDPC, turbo code, or convolution code. The encoder 502 may use a coding rate of $\log 2(1+\text{SNR}0x)$ where 'x' represents the selected relay station 104 number. After encoding, the interleaver 504 may interleave the data by arrange the data in a non-contiguous way to improve performance, particularly with respect to preventing burst errors. The quadrature amplitude modulation (QAM) modulator 506 may then modulate the data by changing, or modulating, the amplitude of two carrier waves to carry the information. Existing or later developed methodologies of encoding, interleaving, and QAM modulation may be utilized as one of ordinary skill in the art will recognize. The encoded and modulated data may then be transmitted over the channel between the base station 102 and the selected relay station 104. Encoding block 500 may be useful, for example, during the second stage of the disclosed embodiments where the base station 102 transmits data to the selected relay station 104 for a duration $(1-\lambda)T$.

FIG. 6 depicts a block diagram showing an example encoding block for a relay station 104 during the third stage according to various embodiments. Encoding block 600 includes an encoder 602, an interleaver 604, a QAM modulator 606, and a random phase module 608. Data enters the encoder 602 for encoding, and encoder 602 may utilize any type of encoding scheme, such as LDPC, turbo code, or convolution code. Encoder 602 may utilize jointly designed multi-access code in conjunction with an encoder in the base station 102 that is transmitting simultaneously. The encoder 602 may use a coding rate of $\log 2(1+\text{SNR}03+\text{SNR}x3)-\log 2(1+\text{SNR}03)$ where 'x' represents the selected relay station 104 number. After encoding, the interleaver 604 may interleave the data by arrange the data in a non-contiguous way to improve performance (e.g., preventing burst errors). The QAM modulator 606 may then modulate the data by changing, or modulating, the amplitude of two carrier waves to carry the information. The random phase module 608 may then introduce a random phase to the modulated signal to make the channels to the user be independent (with respect to the signal from the base station 102). The encoded, modulated, and randomized data may then be transmitted over the channel between the relay station 104 and the user 108. Encoding block 600 may be useful, for example, during the third stage of the disclosed embodiments where the relay station 104 transmits data to the user 108 for a duration $\lambda T$ simultaneously with the base station 102.

FIG. 7 depicts a block diagram showing an example encoding block for a base station 102 during the third stage according to various embodiments. Encoding block 700 includes an encoder 702, an interleaver 704, a QAM modulator 706, and a random phase module 708. Data enters the encoder 702 for encoding, and encoder 702 may utilize any type of encoding scheme, such as LDPC, turbo code, or convolution code. Encoder 702 may utilize jointly designed multi-access code in conjunction with an encoder in the selected relay station 104 that is transmitting simultaneously. The encoder 702 may use a coding rate of $\log_2(1+SNR03)$. After encoding, the interleaver 704 may interleave the data by arrange the data in a non-contiguous way to improve performance (e.g., preventing burst errors). The QAM modulator 706 may then modulate the data by changing, or modulating, the amplitude of two carrier waves to carry the information. The random phase module 708 may then introduce a random phase to the modulated signal to make the channels to the user be independent (with respect to the signal from the relay station 104). The encoded, modulated, and randomized data may then be transmitted over the channel between the base station 102 and the user 108. Encoding block 700 may be useful, for example, during the third stage of the disclosed embodiments where the base station 102 transmits data to the user 108 for a duration $\lambda T$ simultaneously with the relay station 104 encoder 602 of FIG. 6.

Figure 8:
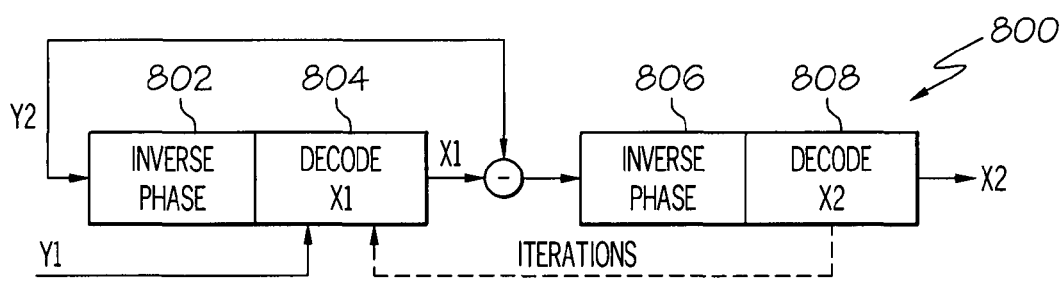
FIG. 8 depicts a block diagram showing an example decoding block for a user according to various embodiments.

FIG. 8 depicts a block diagram showing an example decoding block for a user 108 according to various embodiments. The decoding block 800 may utilize joint interference cancellation with assistance from the second stage signal. Decoding block 800 includes a first inverse phase 802, a first X1 decoder 804, a second inverse phase 806, and a second X2 decoder 808. In some embodiments, the first X1 decoder 804 first decodes the codeword from the relay station 104 (i.e., X1 signal) by treating the other codeword from the base station 102 (i.e., X2 signal) as noise. In addition to this, because the user 108 overhears the transmission from the second stage when the base station 102 transmits to the selected relay station 104, this signal (Y1) can be combined to decode X1. Then the decoder block 800 subtracts X1 from Y2 and decodes X2. This may be iterated back and forth until it converges. When the codes are not complex, an alternative is to use maximum likelihood decoding.

Figure 9:
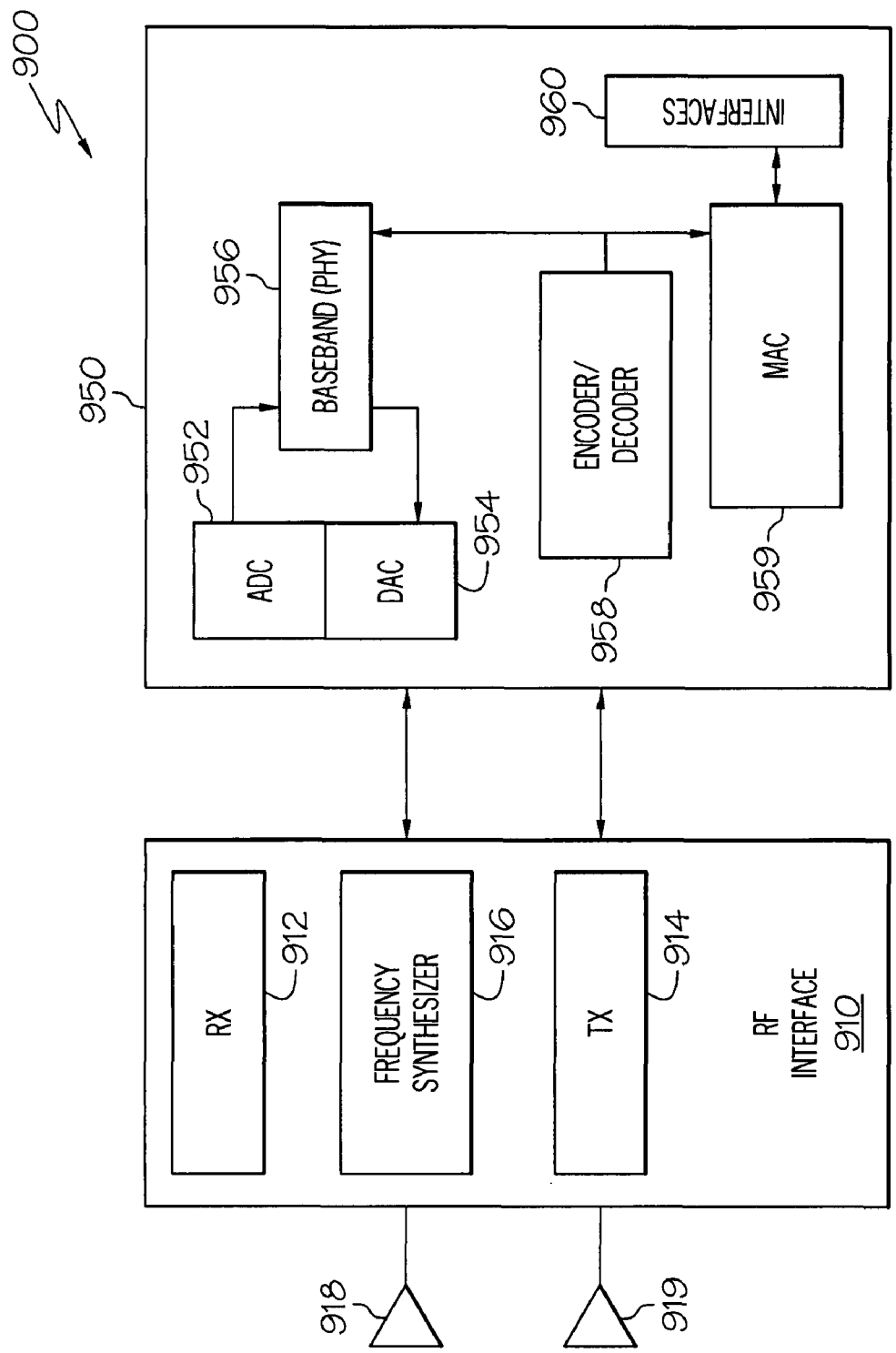
FIG. 9 depicts a block diagram showing an example wireless apparatus according to various embodiments.

FIG. 9 depicts a block diagram showing an example wireless apparatus according to various embodiments. Apparatus 900 for use in a wireless network may include a processing circuit 950 including logic (e.g., circuitry, processor(s) and software, or combination thereof) to route communications as described in one or more of the processes above. In certain embodiments, apparatus 900 may generally include a radio frequency (RF) interface 910 and a baseband and MAC processor portion within the processing circuit 950.

In one example embodiment, RF interface 910 may be any component or combination of components adapted to send and receive modulated signals. RF interface 910 may include, for example, a receiver 912, a transmitter 914 and a frequency synthesizer 916. RF interface 910 may also include bias controls, a crystal oscillator and/or one or more antennas 918, 919 if desired. Furthermore, RF interface 910 may alternatively or additionally use external voltage-controlled oscillators (VCOs), surface acoustic wave filters, intermediate frequency (IF) filters, and/or radio frequency (RF) filters as desired. Various RF interface designs and their operation are known in the art and the description for configuration thereof is therefore omitted. In some embodiments RF interface 910 may be configured to provide OTA link access which is compatible with one or more of the IEEE standards for WPANs, WLANs, WMANs or WWANs, although the embodiments are not limited in this respect.

Processing circuit 950 may communicate/cooperate with RF interface 910 to process receive/transmit signals and may include, by way of example only, an analog-to-digital converter 952 for digitizing received signals, a digital-to-analog converter 954 for up converting signals for carrier wave transmission, and a baseband processor 956 for physical (PHY) link layer processing of respective receive/transmit signals. Processing circuit 950 may also include or be comprised of a processing circuit 959 for MAC/data link layer processing.

In certain embodiments of the present invention, an encoder/decoder 958 may be included in processing circuit 950 and which may function to encode or decode signals, as described previously. The encoder/decoder 958, for example, may implement one or more of the encoding blocks 500, 600, 700 or the decoding block 800 of FIGS. 5-8. Alternatively or in addition, PHY circuit 956 or MAC processor 959 may share processing for certain of these functions or perform these processes independently. MAC and PHY processing may also be integrated into a single circuit if desired.

Apparatus 900 may be, for example, a mobile station, a wireless base station or AP, a hybrid coordinator (HC), a wireless router and/or a network adaptor for electronic devices. Accordingly, the previously described functions and/or specific configurations of apparatus 900 could be included or omitted as suitably desired.

Embodiments of apparatus 900 may be implemented using single input single output (SISO) architectures. However, as shown in FIG. 9, certain implementations may use multiple input multiple output (MIMO), multiple input single output (MISO) or single input multiple output (SIMO) architectures having multiple antennas (e.g., 918, 919) for transmission and/or reception. Further, embodiments of the invention may utilize multi-carrier code division multiplexing (MC-CDMA) multi-carrier direct sequence code division multiplexing (MC-DS-CDMA) for OTA link access or any other existing or future arising modulation or multiplexing scheme compatible with the features of the inventive embodiments.

The components and features of apparatus 900 may be implemented using any combination of discrete circuitry, application specific integrated circuits (ASICs), logic gates and/or single chip architectures. Further, the features of apparatus 900 may be implemented using microcontrollers, programmable logic arrays and/or microprocessors or any combination of the foregoing where suitably appropriate (collectively or individually referred to as "logic").

It should be appreciated that the example apparatus 900 represents only one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Unless contrary to physical possibility, the inventors envision the methods described herein: (i) may be performed in any sequence and/or in any combination; and (ii) the components of respective embodiments may be combined in any manner.

Although there have been described example embodiments of this novel invention, many variations and modifications are possible without departing from the scope of the invention. Accordingly the inventive embodiments are not limited by the specific disclosure above, but rather should be limited only by the scope of the appended claims and their legal equivalents.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method for communicating in a wireless network by transmitting data packets to a user for a duration of a total transmitting time (T), comprising:
   determining by a base station a signal-to-noise ratio (SNR) for channels between a base station and the user, between one or more relay stations and the user, and between the base station and the one or more relay stations;
   selecting by the base station a relay station from the one or more relay stations based on the determined SNRs;
   determining by the base station a time-sharing parameter ($\lambda$) for the selected relay station based on each of the determined base station-user SNR, selected relay station-user SNR, and base station-selected relay station SNRs;
   by the base station, encoding signals using a coding rate of the binary logarithm of the sum of 1 and the base station-selected relay station SNR and transmitting the encoded signals to the selected relay station for a first duration equal to $(1-\lambda)T$;
   by the base station, encoding and transmitting signals comprising data packets by the base station to the user using multi-access code for a second duration equal to $\lambda T$, wherein the base station encodes the signals transmitted for the second duration using a coding rate of the binary logarithm of the sum of 1 and the base station-selected relay station SNR; and
   by the selected relay station, encoding and transmitting signals comprising data packets by the selected relay station to the user simultaneously with the base station transmitting to the user using multi-access code for the second duration equal to $\lambda T$, wherein the simultaneous signal transmissions are adapted to be decoded utilizing joint decoding with interference cancellation, and
   wherein further the selected relay station encodes the signals using a coding rate of the difference between a first binary logarithm of the sum of 1 and the base station-selected relay station SNR and the selected relay station-user SNR and a second binary logarithm of the sum of 1 plus the base station-selected relay station SNR.

2. The method of claim 1, further comprising decoding by the user the simultaneous signal transmissions utilizing joint decoding with interference cancellation.

3. The method of claim 2, further comprising processing by the user the decoded simultaneous signal transmissions.

4. The method of claim 1, further comprising processing the decoded transmissions by the user.

5. The method of claim 1, further comprising, before transmitting signals simultaneously by the base station and the selected relay station to the user using multi-access code, introducing by the base station a random phase to the signals to be transmitted to decrease correlation between the signals.

6. The method of claim 1, wherein determining a SNR for the channels comprises:
   sending out pilots from a base station to one or more relay stations and a user; and
   sending out pilots from the one or more relay stations to the user.

7. The method of claim 1, wherein selecting the relay station from the one or more relay stations based on the determined SNRs comprises selecting a relay station that provides a larger rate than other relay stations.

8. The method of claim 1, wherein selecting the relay station from the one or more relay stations based on the determined SNRs comprises selecting a relay station based on network traffic.

9. A wireless system, comprising:
   a base station comprising:
      a processing circuit including base station logic to transmit data packets to a user for a duration of a total transmitting time (T) by including logic to select a relay station, to determine a time-sharing parameter ($\lambda$) for the selected relay station based on each of the determined base station-user SNR, selected relay station-user SNR, and base station-selected relay station SNRs, to encode and transmit a first signal to the selected relay station for a first duration equal to $(1-\lambda)T$ using a coding rate of the binary logarithm of the sum of 1 and the base station-selected relay station SNR, and to transmit to the user a second signal using multi-access code for a second duration equal to $\lambda T$, using a coding rate of the binary logarithm of the sum of 1 and the base station-selected relay station SNR wherein the logic to transmit to the user transmits the second signal simultaneously with the selected relay station;
      a radio frequency (RF) interface communicatively coupled to the processing circuit; and
      at least one antenna coupled to the RF interface; and
   a selected relay station comprising:
      a processing circuit including selected relay station logic to encode and transmit data packets to a user simultaneously with the base station using a coding rate of the difference between a first binary logarithm of the sum of 1 and the base station-selected relay station SNR and the selected relay station-user SNR and a second binary logarithm of the sum of 1 plus the base station-selected relay station SNR;
      a radio frequency (RF) interface communicatively coupled to the processing circuit; and
      at least one antenna coupled to the RF interface.

10. The wireless system of claim 9, wherein the base station logic determines a signal-to-noise ratio (SNR) for channels between a base station and a user, between one or more relay stations and the user, and between the base station and the one or more relay stations.

11. The wireless system of claim 10, wherein the base station logic selects the relay station from the one or more relay stations based on the determined SNRs by selecting a relay station that provides a larger rate than other relay stations.

12. The wireless system of claim 10, wherein the base station logic determines SNRs by sending out a pilot from a base station to one or more relay stations and a user.

13. The wireless system of claim 9, wherein the base station logic introduces a random phase to signals to be transmitted to decrease correlation between the signals.

14. The wireless system of claim 9, further comprising a processing circuit of a user including logic to decode received simultaneous signal transmissions utilizing joint decoding with interference cancellation.

* * * * *